US005379345A

United States Patent [19]

Greenberg

[11] Patent Number: 5,379,345

[45] Date of Patent: Jan. 3, 1995

[54] METHOD AND APPARATUS FOR THE PROCESSING OF ENCODED DATA IN CONJUNCTION WITH AN AUDIO BROADCAST

[75] Inventor: Burton L. Greenberg, New York, N.Y.

[73] Assignee: Radio Audit Systems, Inc., Peekskill, N.Y.

[21] Appl. No.: 11,209

[22] Filed: Jan. 29, 1993

[51] Int. Cl.[6] ........ H04L 9/00

[52] U.S. Cl. ........ 380/23; 375/1; 380/6; 380/20; 380/31; 380/34; 380/49; 340/825.31; 340/825.34

[58] Field of Search ........ 375/1; 380/34, 6, 20, 380/23, 49, 50, 31, 33; 358/142-147; 340/825.31, 825.34; 348/461-468, 473-486

[56] References Cited

U.S. PATENT DOCUMENTS 2,881,244 4/1959 Pawley et al. ........ 380/20
3,845,391 10/1974 Crosby ........ 380/23 X
4,079,419 3/1978 Siegle et al. ........ 380/20 X
4,313,197 1/1982 Maxemchuk ........ 375/1 X
4,425,661 1/1984 Moses et al. ........ 375/1
4,547,804 10/1985 Greenberg ........ 358/142
4,639,779 1/1987 Greenberg ........ 358/142
4,805,020 2/1989 Greenberg ........ 358/147
4,945,412 7/1990 Kramer ........ 358/142
4,967,273 10/1990 Greenberg ........ 358/142

*Primary Examiner*—Bernarr E. Gregory
*Attorney, Agent, or Firm*—Schweitzer Cornman & Gross

[57] ABSTRACT

A method and apparatus for the identification and verification of audio transmission segments, such as may be broadcast by a radio station, consists of the generation of a data stream corresponding in duration to the length of the program segment and including both cumulative time data and segment identification data. The data stream is combined with the program segment to which it relates in a manner in which the data is inaudible on conventional reception apparatus and which does not significantly degrade the audio quality of the program segment. A reception facility is provided to extract the data stream from the recorded audio and compare the data therein with reference data for the transmission, including intended length and time of the segment. By such a comparison verification of the broadcast can be accomplished.

16 Claims, 2 Drawing Sheets

METHOD AND APPARATUS FOR THE PROCESSING OF ENCODED DATA IN CONJUNCTION WITH AN AUDIO BROADCAST

The present invention relates to the transmission of information in connection with the transmission of audio signals. In a particular embodiment, the invention is directed to a and apparatus for the transmission of associated data with portions of a commercial radio broadcast transmission.

BACKGROUND OF THE INVENTION

There exists a need for applying an identifying "signature" to wireless audio transmissions, In commercial radio, for revenues are raised by a station broadcaster by the acceptance for broadcast of paid programming. Typically, such paid programming is in the form of commercials or advertisements, but revenues may also be generated by the broadcast of paid political announcements, quasi "public interest" transmissions and the like. The consideration paid by the advertiser or its agent, such as an advertising agency, is a function of both the length of the advertising "spot" to be aired and the potential audience reachable by the station at the time of intended broadcast. It is obviously the concern of the advertiser that it receive a proper return on its investment; that is, that the station broadcast a signal which bears the entirety of its programming at the agreed-upon time and in the proper rotation of commercials ordered.

The major radio broadcast networks alone have some 5700 local affiliate stations. Each station has the ability to broadcast local advertising spots, as well as spots provided by the network. Any practical system for monitoring air time must be capable of identifying both the originator of the spot and the station over which it is transmitted.

While the number of listeners tuned to a station is beyond the direct control of the broadcaster, the broadcaster does have direct control over the condition of the signal it transmits. Among the advertiser's concerns which are within the broadcaster's control are the quality of the audio signal bearing the commercial, and the airing of the entirety of the spot at the proper time and in the proper order.

It is vitally important to the advertiser that the entirety of its spot be transmitted. As commercials are often prepared with the "tag" or "punch" at the end of the spot, it is important that the commercial does not end prematurely. If, for example, a 60-second spot is only broadcast for 55 seconds, shortening of air time due to loss occurring at the beginning of the spot is of less concern than loss at the end. Thus, while any time loss is meaningful, the position of such loss within the commercial is determinative of the loss of value resulting therefrom.

While it has been a standard industry practice for stations to maintain logs of the content of their broadcasts, the log is unable to document the specific identity, quality or precise length of a broadcast segment. In addition, because the logs are maintained by station personnel themselves, there exists the possibility that inaccurate or erroneous information can be transcribed. Third-party services also make off-the-air recordings of station broadcasts, and compile reports based upon review of the recordings. This is a time consuming process, however, as the actual analysis of the tape is performed by a human listener. The monitoring of a large number of broadcasts over a significant length of time is both costly and inefficient.

Another methodology employed to confirm the existence of the airing of a particular spot is to directly compare a recording of the audio track broadcast to a reference recording of the same material. Due to normal degradation of the signal upon broadcast, coupled with static and other atmospheric disturbances, however, such comparison is of only limited reliability. An audio "signature" or "fingerprint" of a portion of an audio segment can be utilized for comparison purposes, but the comparison requires significant analysis. It is believed that such routines are no more than 85% accurate.

It is accordingly a purpose of the present invention to provide a new and improved method and apparatus for the identification and monitoring of a wireless audio broadcast.

Another purpose of the present invention is to provide a new and improved method and apparatus by which audio program identification can be accomplished in an undetectable manner.

Still another purpose of the present invention is to provide such a method and apparatus which does not degrade the audio signal.

Still another purpose of the present invention is to provide such a method and apparatus which permits both source and signal identification and duration data to be determined.

Yet a further purpose of the present invention is to provide such a method and apparatus which may be incorporated into conventional broadcast systems and which may be implemented simply and reliably.

BRIEF DESCRIPTION OF THE INVENTION

The present invention provides for the identification of an audio program segment by use of a unique identifying code. This code, along with a timing code which continues for the duration of the segment, is combined with the segment audio signal in a unique manner which does not cause degradation of the audio signal and which is virtually impossible to detect or modify except by a mating receiving apparatus. Such a receiving apparatus extracts the identification information for recordation and storage, and utilizes the timing information to determine the duration of the coded segment. By use of a progressive timing code initialized by the beginning of the spot, the location in the spot of any loss of signal can be determined.

In a form of the invention particularly well suited for use in connection with a large scale system for monitoring commercial broadcasts, low level spread spectrum encoding for the added data may be utilized to provide a virtually undetectable identification signal.

BRIEF DESCRIPTION OF THE DRAWINGS

A fuller understanding of the present invention and the features and benefits thereof may be obtained upon consideration of the following detailed description of a preferred, but nonetheless illustrative embodiment thereof, when reviewed in association with the annexed drawings, wherein.

DETAILED DESCRIPTION OF THE INVENTION

Figure 1:
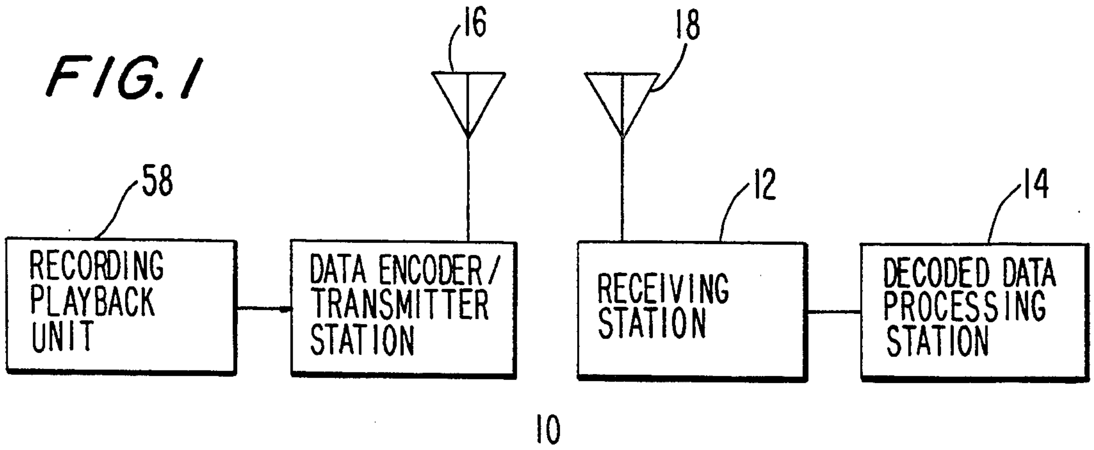
FIG. 1 is a block diagram of an embodiment of the present invention.

As shown in FIG. 1, an illustrative embodiment of the system of the present invention comprises three main system elements; an encoding/transmitting station 10 coupled to an audio recording payback unit 58, a receiver/decoder station 12, and a data processing station 14. Encoding comprises the addition of identification and timing signals to a desired audio signal, which may exist in any one of a variety of forms. For example, standard operating procedures in the radio industry call for the preparation of a master tape, called an "audio master dub" for each commercial to be aired. This master is used to make duplicates which are delivered to each broadcast facility. Alternatively, the contents of the audio master dub may be electronically transmitted to the broadcast station over a telephone line, microwave link, or other transmission means, and re-recorded locally at the station. The recorded material is played and broadcast as known in the art.

In the present invention, the conventional audio signal is combined with the encoded data, the composite signal being broadcast in the conventional manner by transmitting antenna 16 to be received by the listening public in the normal manner. In addition, however, the signal is received by antenna 18 at receiving station 12, typically located at a site chosen to be representative of a typical reception site for the transmission or at the broadcast station site whereby the receiving station equipment may be incorporated into, or serve as associated equipment to reception equipment utilized by the station to monitor the broadcast signal. After decoding, wherein the added data is extracted from the composite signal, the data is passed to a data processing station 14, where analysis of the data is performed. Such a station may be at the site of receiver 12 or may constitute a remote facility.

Figure 2:
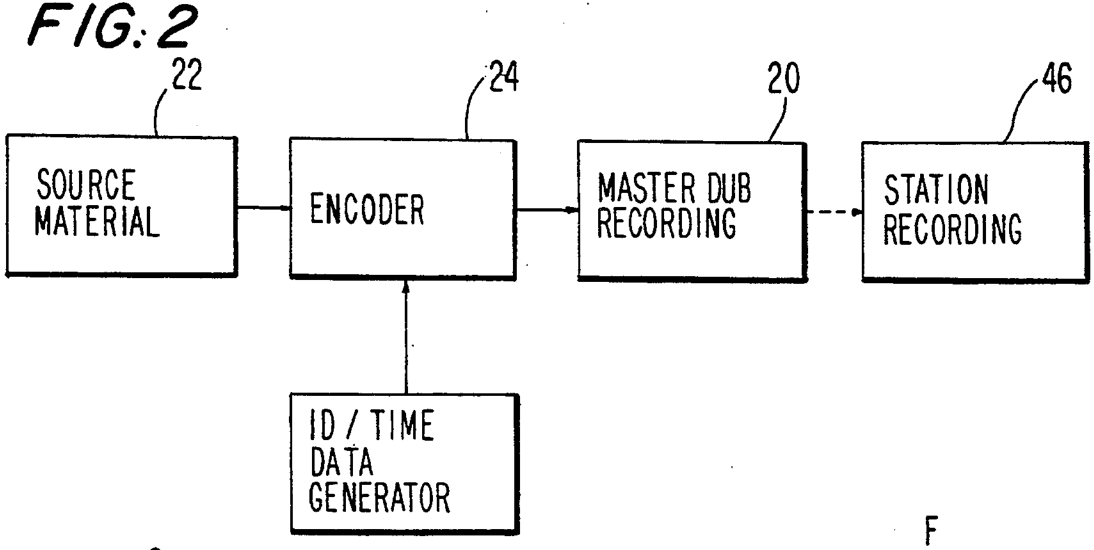
FIG. 2 is a block diagram of the preparation of an audio master dub recording for use in connection with the invention.

As depicted in FIG. 2, in a first embodiment of the present invention an audio master dub 20 is generated at an appropriate facility by combining audio source material 22 with source identification and timing signals through encoder 24. While it is contemplated that the source material 22 will typically be a recording, it is to be recognized that live material as well can be combined with the data to be encoded.

Figure 3:
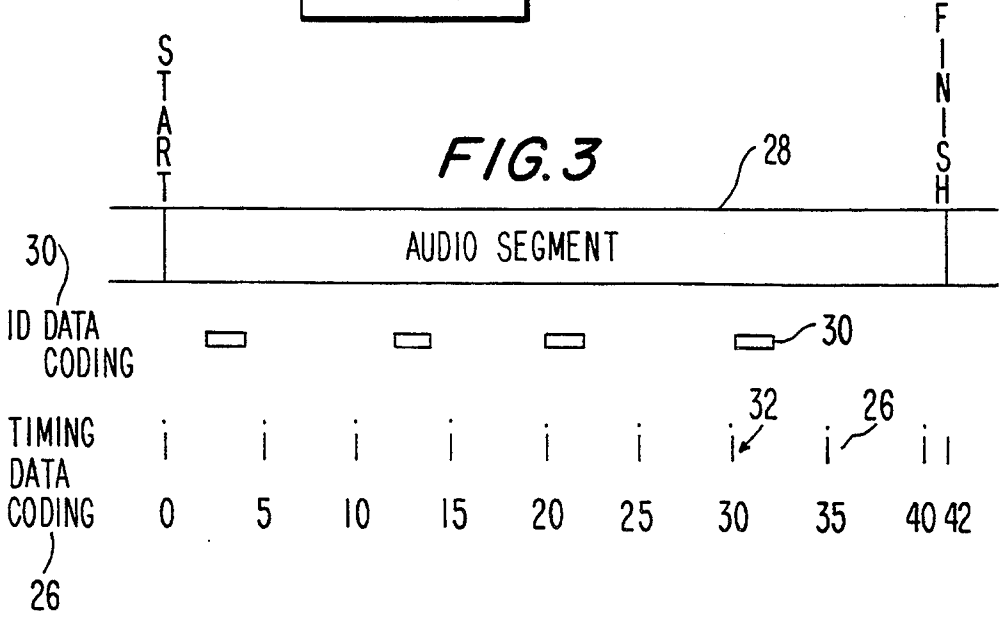
FIG. 3 is a representation of an audio recording with associated data.

As presented in FIG. 3, the identification portion of the encoded data may be, for example, an industry-standard code utilizing an alphanumeric character set to identify both the sponsor and the specific commercial property in a unique manner. This can be used to further identify the source of the spot, (i.e., network or local) by an appropriate code. Encoded in conjunction with the identification data 30 is a timing signal 26, generated by an appropriate time base as known in the art, which commences with the beginning of the spot and which is maintained and incremented through its duration. The timing signal 26 may be a representation of the cumulative duration of the spot on an interval-by-interval basis. Use of a unique marker 32 at each chosen interval, such as every 5 seconds, allows both the duration of the spot, as well as the location of each marked interval within the spot, to be determined. The identification code 30 may also be repeated periodically during the spot to insure that the spot can be identified at the receiving station in the event a portion of the spot is lost. Typically, both the identification code and the timing code may be formed as digital representations of the data to be added.

After the data is encoded and combined with the source audio to produce the master dub 20, the dub is utilized to produce the local tapes 46 in a conventional manner, either by direct duplication and delivery of the resulting composite tape to the station or by transmission of the audio signal by telephone, microwave or the like, and re-recording. As an alternative to being added to the audio signal at the time of creation of a master dub, however, identification and timing data can be applied locally, on a station-by-station basis. This may be advantageous if the data is to include a station identifier in addition to spot information. The resultant composite recording 46, whether produced remote or local to the broadcaster, contains the original audio signal with an embedded data signal which cannot be decoded or heard without specialized decoding circuitry.

The added information data must be combined with the audio signal in a manner which does not degrade the audio. In addition, it is preferable that the data be combined with the audio signal in a manner which makes it difficult, if not impossible, for unauthorized personnel to either read the data or be able to modify it.

A particularly preferred methodology for such combining of data incorporates the use of spread spectrum communication technology. Spread spectrum communication is a modulation technique in which a communications signal is spread over an extended frequency range. In the present invention, the use of a digitized data signal combined with the conventional audio broadcast provides a broadening of the audio signal, which can be detected and utilized by an appropriate receiver to extract the encoded data from the broadcast signal.

While the digital representation of the data to be added can be combined directly with the conventional audio signal, a preferred methodology is to further process the data for increased security and more reliable transmission. In a preferred embodiment each bit of the digital data string is itself further converted into a digital data string, preferably of the type which allows accurate verification at the reception end. One skilled in the art will recognize that the use of an appropriate "code vector", or conversion key of the "Gold Code" format, having a length of $^{n}-1$ bits for each bit of the initial data stream, can provide for transmission at high accuracy and with high security.

In conjunction with the present invention, a code vector of 511 (n=9) or 1023 (n=10) bits is presently contemplated. Each "one" bit in the digitized data is converted to the code vector bit string, while each "zero" in the digitized data is converted to the inverse bit string of the code vector. The conversion is done in real time, at a bit rate sufficiently fast to preserve the temporal relationship of the data signal to the audio track. The sequence of code vectors and inverted code vectors representing the identification and timing signals is then combined with the audio signal through the encoder 24 to yield a new master dub tape 20. The level of the encoded data is very low, typically not to exceed the level of ambient noise for the recording. To the general listener, no change in the signal can be perceived. The encoded recording can then be utilized in the conventional manner by the broadcast station. The summing of the high bit rate encoded data with the audio signal results in a broadening of the frequency spectrum of the audio. While insufficient to cause signal degradation to a listener, the broadening can be perceived and correlated with the appropriate code vector, provided to the reception station to permit the encoded data to be extracted.

Figure 4:
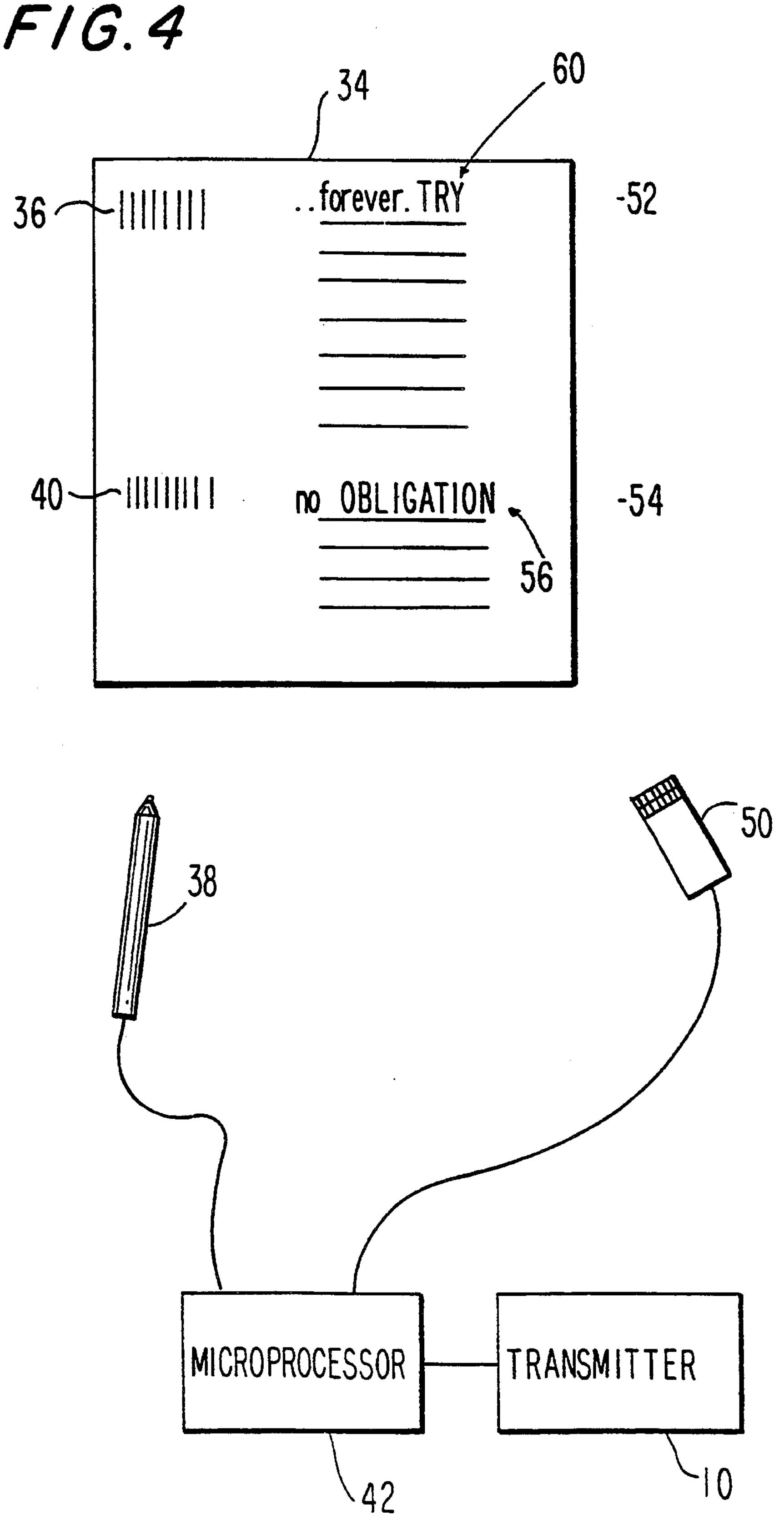
FIG. 4 is a depiction of an encoding scheme for live broadcasts.

In addition to the encoding of appropriate broadcast data into a recording intended for subsequent broadcast, it is also contemplated that such data may be incorporated into live broadcast transmission segments, such as advertising spots read by an on-the-air radio announcer. As depicted in FIG. 4, the announcer is provided with a script 34 having a text portion 44 and bar coding 36 in the margin adjacent the portion of the script text corresponding to the spot for which encoding is required. The script may itself be highlighted at 60, or otherwise provided with indicia to remind the reader that a swipe is to begin. By use of a light pen 38, the announcer swipes or reads the coding at the commencement 52 of the marked script portion and swipes it a second time at its conclusion 54, which may bear similar highlighting indicia 56. Alternatively, a second bar coding 40 may be positioned on the script page adjacent the end of the script portion desired to be identified. This may be of value when the script is lengthy to avoid the time and effort which might be required for the announcer to return to the commencement of the segment. The bar coding will contain the identification of the content of the script. The swiping occurs as the announcer reads the text into the microphone 50.

The light pen is connected to a suitable microprocessor 42 which either utilizes the bar coded data directly or, by use of stored conversion routines, identifies the code and associates it with stored identification data. In either case, the appropriate identification data is generated for encoding. The microphone 50 is also coupled to the microprocessor, which combines the identification data with the audio signal for broadcast through the transmission equipment 10. The initial swipe also cues the microprocessor to commence generation of sequential timing signals by an internal clock, such timing signals, as well as other data to be encoded, halting upon receipt of the second, spot-closing, swipe.

Upon reception, a broadcast including the encoded data cannot be distinguished by the listener from a conventional broadcast not including such information. At the monitoring station 12, however, the receiving apparatus contains appropriate circuitry to detect and decode the embedded data. Because of the characteristics of the code vector as previously described, a receiver having knowledge of the code vector can assemble a running bit string of a length corresponding to the length of the code vector and utilize it to extract the binary data stream. Once decoded, the data may be stored, along with a locally generated time code, to permit analysis of the spots to be accomplished. Because the decoding can be performed essentially in real time, the sensing of encoded data may further serve as a cue for further or additional processing. For example, it may be desirous to provide a recording of the received audio signal to verify the encoded data. Such recording can be done on a selective basis, initiated by the sensing of an embedded data string, without the need for human intervention or editing.

The data processing facility 14 receives the data as decoded by the receiver. Because the present invention is well suited for the monitoring and analysis of broadcast data in many markets and/or many stations, a preferred embodiment provides a central facility which receives data from a plurality of receiver sites. The data may be stored and conveyed in the form of disc or tape records, or may be transmitted to the central facility by dedicated or public phone lines, radio/microwave or the like. Alternatively, on-site equipment, at the receiving facility 12, can be employed for processing. The processing facility is provided with reference data, typically provided by advertising agencies or others on behalf of the spot owners, which includes, by spot identification code, the time, day, date and stations for the spot. The known intended duration for the spot is also provided. It is to be recognized, however, that the intended duration is of primary value only in the case where the spot is prerecorded. Due to variation in presentation, a live spot may not lend itself to duration comparison with any meaningful level of confidence.

The receiver at station 12 may be dedicated to a given broadcast station, in which a plurality of individually-tuned receivers may be gauged together; or may alternatively be of the type which can scan across a plurality of frequencies. With an appropriately high scan rate, it may be possible to multiplex several stations into a single output stream without compromising data integrity.

By use of appropriate known merge and processing techniques, the broadcast-derived data, including station identification, is compared to the reference data and appropriate reports generated. In a first report form, only discrepancies between expected and actual broadcast are displayed, the encoded timing signals allowing a precise determination of both the duration and position of signal loss to be determined and presented. In the event the corroboration is required, the audio record can be accessed.

In another form, a report can be utilized for billing purposes to the sponsor, whereby each occasion of a spot broadcast can be identified and presented to the sponsor, thus providing independent and accurate airtime charge computation and verification. Again, the audiotape record, if generated, can serve as corroboration for the reported data.

I claim:

1. An apparatus for adding identifying indicia to an audio signal segment and subsequently recovering said indicia, comprising: means for combining an inaudible data string having a series of program segment timing marks and at least one presentation of program segment identification data with said audio signal to form an encoded program segment having a non-degraded audio signal portion, at least the timing marks portion of said data string extending for the length of the non-degraded audio signal portion; a broadcast station for transmitting said encoded program segment; a reception station for receiving the transmitted program segment, said reception station comprising means for identifying said inaudible data string portion of said encoded program segment and generating a data signal having said program identification data and timing marks; means for associating said program identification data and timing marks of said data signal with reference program segment data including segment length, identification and airing information; and means for performing an analysis of said program segment as broadcast by use of said program identification data, timing marks, and corresponding reference program segment data.

2. The apparatus of claim 1, wherein said audible signal comprises prerecorded audio material.

3. The apparatus of claim 1, wherein said audible signal comprises live audio material.

4. The apparatus of claim 1, wherein said broadcast station comprises means for combining said audible signal and said inaudible data string in a manner in which the quality of said audible signal is preserved, and means for broadcasting the resultant composite signal.

5. The apparatus of claim 4, wherein said combining means comprises means for performing spread spectrum modulation upon said audible signal by use of said inaudible data string.

6. The apparatus of claim 4, wherein said combining means comprises means for generating first and last timing signals corresponding to the commencement and end of the audible signal and a plurality of interval-defining signals therebetween.

7. The apparatus of claim 6, wherein said audible signal comprises live audio material and said generating means comprises a start signal generator activated at the commencement of the live audio material segment and a stop signal generator activated at the end of the live audio material segment.

8. The apparatus of claim 7, wherein said signal generators comprise a light pen adapted to read coding associated with a script of said live audio market segment.

9. The apparatus of claim 8, wherein said coding is bar coding.

10. The apparatus of claim 1, wherein said generating means includes means for determining whether the program segment was broadcast in its entirety and, if not, the portion of said segment not broadcast.

11. The apparatus to claim 1, wherein said associating means for generating a record of the time of receipt of said transmitted audio signal.

12. A method for the identification and verification of program segment signals to be transmitted from a station, comprising:

generating an inaudible program segment data string having a series of program segment timing marks and at least one data burst bearing program segment identification data;

combining said data string with an audible program segment to which said data string relates to form a composite signal wherein the quality of the audible program segment is not significantly degraded;

generating reference program data comprising segment length and intended airing information for said audible program segment;

transmitting said composite signal;

maintaining a reception station for receipt of said composite signal and receiving said composite signal thereby;

extracting said data string from the received composite signal;

associating said program identification data and timing marks of the extracted data string with said reference program segment data; and performing a comparison of time and length of said program segment as broadcast to corresponding reference program segment data.

13. The method of claim 12, whereby said step of combining said data string with the audible program segment signal includes the generation of first and last timing signals corresponding to the commencement and end of the audible signal and a plurality of interval-defining signals therebetween.

14. The method of claim 12, wherein said audible program segment is a live broadcast, wherein said step of generating an inaudible program segment data string comprises the steps of generating a start signal at the commencement of said program segment and generating a stop signal at the end of said program segment.

15. The method of claim 14, wherein said start and stop signal generation steps comprise the swipe of a light pen across by indicia readable thereby associated with a text of said program segment.

16. The method of claim 15, wherein said swipe steps are performed by a reader of said text, the voice of said reader comprising said program segment.

* * * * *